United States Patent [19]
Kehren

[11] 4,012,601
[45] Mar. 15, 1977

[54] AUTOMATIC PUSHBUTTON DIAL ASSEMBLY FOR A SUBSCRIBER TELEPHONE

[75] Inventor: Engelbert W. Kehren, Dallas, Tex.

[73] Assignee: Texas Instruments Incorporated, Dallas, Tex.

[22] Filed: Apr. 4, 1975

[21] Appl. No.: 565,302

[52] U.S. Cl. ............................................. 179/90 K
[51] Int. Cl.² .................... H04M 1/50; H04M 1/42
[58] Field of Search .......... 179/90 K, 90 AN, 90 B, 179/90 BB, 90 BD, 2 DP; 340/365 S; 200/159 A

[56] References Cited
UNITED STATES PATENTS

| | | | |
|---|---|---|---|
| 3,479,470 | 11/1969 | Ham, Jr. | 179/90 K |
| 3,523,163 | 8/1970 | Andren | 179/90 K |
| 3,676,607 | 7/1972 | Nash et al. | 179/90 K |
| 3,760,121 | 9/1973 | Nissim | 179/90 AN |
| 3,856,982 | 12/1974 | Lawson et al. | 179/90 K |
| 3,882,284 | 5/1975 | Munday | 179/90 B |

*Primary Examiner*—William C. Cooper
*Assistant Examiner*—Gerald L. Brigance
*Attorney, Agent, or Firm*—Harold Levine; Rene' Grossman; Stephen S. Sadacca

[57] ABSTRACT

An automatic dial for a subscriber telephone utilizes a keyboard array to enter coded information into an integrated circuit digit processor. The digit processor includes a programmed ROM for storing an instruction set to control the operation of the dial, an arithmetic/logic unit for performing arithmetic and logic operations on data according to said instruction set, and a first read/write RAM for storing the data being processed. A second integrated circuit RAM, which is selectively connected to the output of the digit processor, is provided for the storage and retrieval of changeable groups of selected telephone numbers. A pulse or tone generator is also selectively connected at the output of the digit processor for the selective transmission of pulse or tone signals over the telephone lines according to the stored instruction set and coded information derived from the keyboard.

The integrated circuits and pulse or tone generator are arranged on a single circuit board mounted on the bottom side of a mounting bracket with an insulator sandwiched between the circuit board conductors and the mounting bracket. The keyboard is provided on the upper side of the mounting bracket with insulated conductors selectively connecting the key terminals to the circuit board. The bracket is adapted to be mounted in any standard subscriber telephone unit with standard pulse or tone generator conductors and mute conductors provided for connection to any standard telephone network.

This invention relates to an automatic dial system for a subscriber telephone set and more particularly to an automatic dial system which utilizes a digit processor for control.

7 Claims, 8 Drawing Figures

AUTOMATIC PUSHBUTTON DIAL ASSEMBLY FOR A SUBSCRIBER TELEPHONE

BACKGROUND OF THE INVENTION

Many types of dialing systems are known in which a group of telephone numbers can be stored and, upon manual selection, a particular number is transmitted over a telephone line to a central station to provide a transmission linkage between the calling station and the selected called station. One well known dialing system employs a tape or belt mounted for forward and backward motion by a suitable transport mechanism. Magnetic or optically coded signals are recorded across the width of the magnetic tape to represent each stored telephone number. To dial a particular number, the tape is moved to an index position where the stored number is in registration with a read head which scans across the width of the tape to decode the data content thereof and cause dialing information to be transmitted to effect the connection to a called station. See, for example, U.S. Pat. No. 3,757,054. In another known telephone dialer, information is stored in the form of perforations on cards which can be selectively inserted into a card-reading mechanism to dial the number encoded on the card. In still other known telephone dialers, a manual, mechanically alterable memory is comprised of interwired switches or matrix crossings such that a telephone number is stored by predetermined switch settings or matrix linkages and a particular telephone number is read out by activating a selector switch corresponding to the switches or matrix containing the stored number. See, for example, U.S. Pat. No. 3,555,201 and 3,665,113. These dialing systems are all rather mechanically complex to manufacture, operate and maintain, and relatively expensive.

Specialized electronic circuits have been proposed for use in conjunction with telephone numbers stored in a random access memory but such circuits have generally been rather limited because they require separate buttons to address each telephone number stored in addition to a 0–9 digit keyboard for entry of telephone numbers to be stored. See, for example, U.S. Pat. No. 3,735,050. It is desirable to have a simple dialing system which is adapted to efficiently and easily store a desired repertoire of telephone numbers.

It is therefore an object of the present invention to provide a simple and relatively inexpensive automatic dial system for a subscriber telephone set which has the capability of storing a group of telephone numbers and which performs automatic dialing of the stored telephone numbers.

Another object of the invention is to provide an easily expandable automatic dial system for a subscriber telephone utilizing a randomly accessed electronic memory.

A further object of the invention is to provide an automatic dial system for a subscriber telephone which requires only a single numeric keyboard array for storing telephone numbers, manually dialing telephone numbers and selectively retrieving telephone numbers from a memory for automatic dialing.

It is still another object of the invention to provide a replacement telephone dial capable of being mounted in any standard telephone set without altering the existing physical structure to provide the telephone set with automatic dialing capability.

SUMMARY OF AN EMBODIMENT OF THE INVENTION

In accordance with the present invention, an automatic dial system for subscriber telephones utilizes a keyboard array to enter coded information into an integrated circuit digit processor. The digit processor includes a programmed read-only-memory (ROM) for storing an instruction set to control the operation of the dial system, an arithmetic/logic unit (ALU) for performing arithmetic and logic operations on data according to the stored instruction set, and a first random access memory (RAM) for storing the data being processed. A second integrated circuit RAM, which is selectively connected at the outputs of the digit processor, is provided for the storage and retrieval of changeable groups of selected telephone numbers. A pulse or tone generator is also selectively connected at the output of the digit processor for the selective transmission of dial signals over the telephone lines according to the stored instruction set and coded information derived from the keyboard.

In a preferred embodiment, the digit processor is comprised of a calculator type system with the ROM, RAM and ALU integrated on a single chip of semiconductor material with the second integrated circuit RAM and pulse or tone generator selectively connected at the digit and segment outputs of the calculator system. The second RAM is expandable in size so that a repertoire of desired size is most efficiently storable.

A single keyboard, in conjunction with the digit processor, is utilized to address and write telephone numbers in the second RAM, manually dial telephone numbers to be transmitted, and address the second RAM to retrieve telephone numbers stored therein to be transmitted in the auto-dial mode.

The integrated circuits and pulse or tone generator are arranged on a single circuit board mounted on the bottom side of a mounting bracket with an insulator sandwiched between the circuit board conductors and the mounting bracket. The keyboard is provided on the upper side of the mounting bracket with insulated conductors selectively connecting the key terminals to the circuit board. The bracket is adapted to be mounted in any standard subscriber telephone unit with standard pulse or tone generator conductors and mute conductors provided for connection to any standard telephone network.

BRIEF DESCRIPTION OF THE DRAWINGS

The novel features believed characteristic of the invention are set forth in the appended claims. The invention itself, however, as well as other features and advantages thereof, will best be understood by reference to the detailed description which follows, read in conjunction with the accompanying drawings, wherein:

DETAILED DESCRIPTION OF A PREFERRED EMBODIMENT

Figures 1A, 1B:
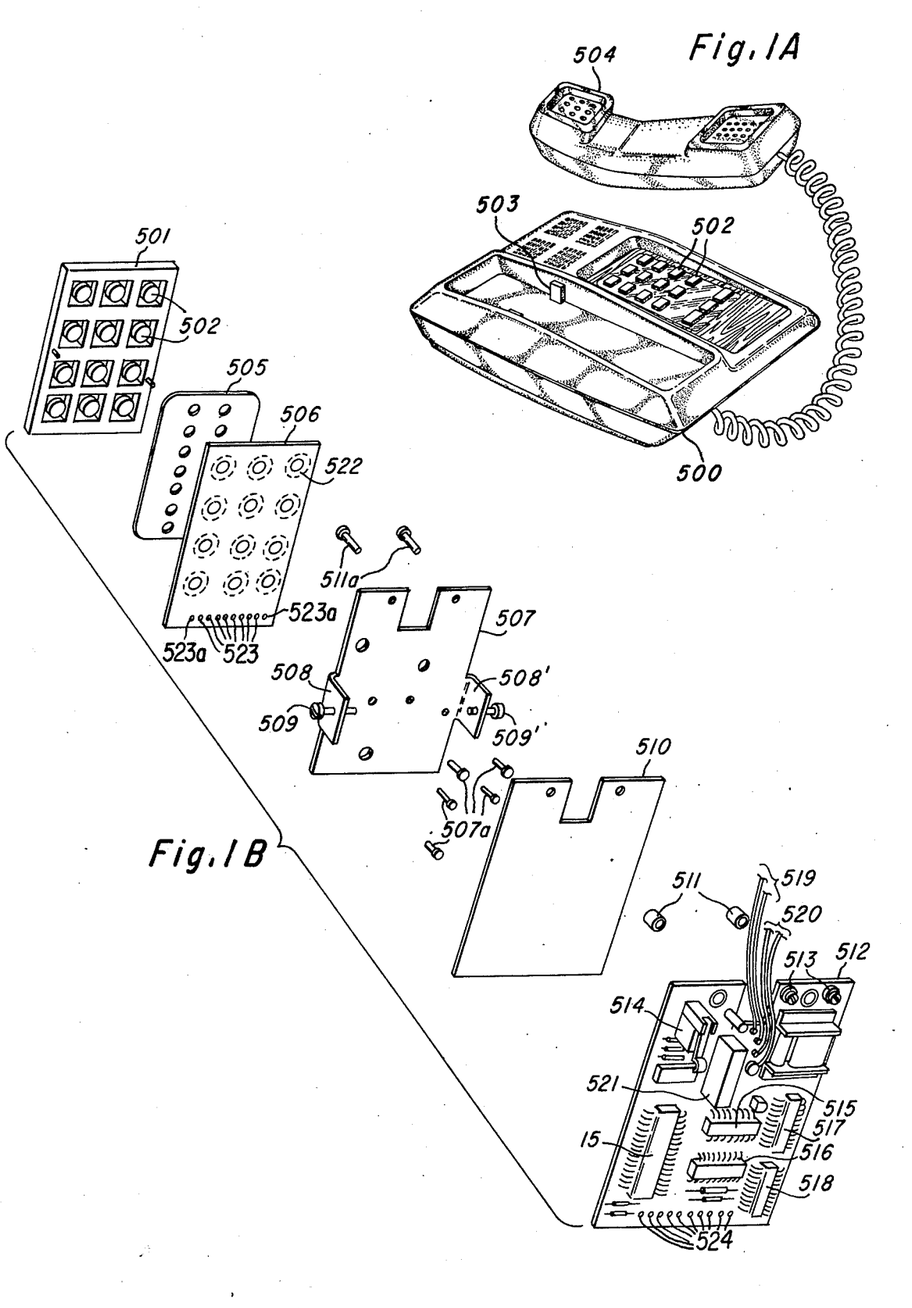
FIG. 1A is a pictorial view of a subscriber telephone provided with an automatic dial system according to the present invention.
FIG. 1B is an exploded view showing the mechanical assembly of the automatic dial system as utilized in conjunction with an embodiment of the present invention.

An automatic dial system for a subscriber telephone set utilizes a keyboard array to enter coded information into an integrated circuit digit processor. Certain aspects of this system are disclosed and claimed in copending U.S. patent application Ser. No. (TI-5252) filed of even date with and assigned to the assignee of the present invention and is incorporated herein by reference. The automatic dial system includes an integrated circuit RAM selectively connected to the output of the digit processor to provide for the storage and retrieval of changeable groups of selected telephone numbers. A pulse or tone generator is also selectively connected at the output of the digit processor for the selective transmission of pulse or tone signals over the telephone lines according to the stored instruction set and coded information derived from the keyboard. In accordance with the present invention, the keyboard and circuits are provided as a compact assembly which may be mounted in any standard subscriber telephone set such as those manufactured by Western Electric, ITT and the like. The assembly may also be mounted in a special stylized telephone set 500 such as that illustrated in FIG. 1A. The telephone housing of FIG. 1A is the subject matter of copending design patent application Ser. No. 520,683, filed November 4, 1974 and assigned to the assignee of the present invention. The telephone of FIG. 1A includes a handset 504 which activates switch hook 503 to be in a first open circuit position when handset 504 is removed from its cradle as shown. A keyboard array is provided with only keys 502 being visibly exposed in FIG. 1A.

Referring to FIG. 1B, the automatic dial system utilizes the keyboard array to enter coded information into an integrated circuit digit processor 15. The keyboard array is comprised of a support substrate 501 which supports the movable keys 502. A printed circuit board 506 is provided with normally open contact members 522 to provide ten or more single pole, single throw momentary contact switches. A flexible insulator member 505 sandwiched between the support member 501 and the substrate 506 protects the contact members 522. One contact of each pair of momentary contact switches is individually terminated at 523 with the other terminal of each momentary contact switch terminated in a commoned terminal at 523 on the substrate 506. A schematic diagram of the keyboard array is given in FIGS. 2B-2 and 2C-2.

The keyboard array is mounted on an upper surface of a metal mounting bracket 507 by rivets 507a or other suitable means. The switch contacts 522 are insulated from bracket 507 by means of the insulating properties of substrate 506 and the terminals 523 extend over the edge of bracket 507 so as to be out of contact therewith. Mounting bracket 507 includes two bent over tab members 508 and 508' with screw members 509 and 509' for mounting in a complementary bracket 525 as will be discussed further with respect to FIG. 1C.

Digit processor 15, RAMs 517 and 518 for storing the repertoire of telephone numbers, dial signal generator 521, resistive networks 515 and 516 coupling the RAMS 517 and 518 to the digit processor 15, and switch means 514 are mounted in a single plane on substrate 512. Substrate 512 is preferably a printed circuit board having printed interconnects on at least the surface opposite the surface upon which the components are mounted. Printed circuit board 512 is attached to mounting bracket 507 by means of rivet members or the like 511a through spacers 511. The keyboard array is coupled to digit processor 15 by means of insulated wire conductors (not shown) selectively coupling key terminals 523 to printed circuit board terminals 524, which are in turn selectively coupled to digit processor 15 by means of printed wiring (not shown). An insulating member 510 is sandwiched between the metal mounting bracket 507 and the printed circuit board 512 to prevent undesired electrical connection between the printed wiring on the printed circuit board and the metal mounting bracket 507.

Figure 1C:
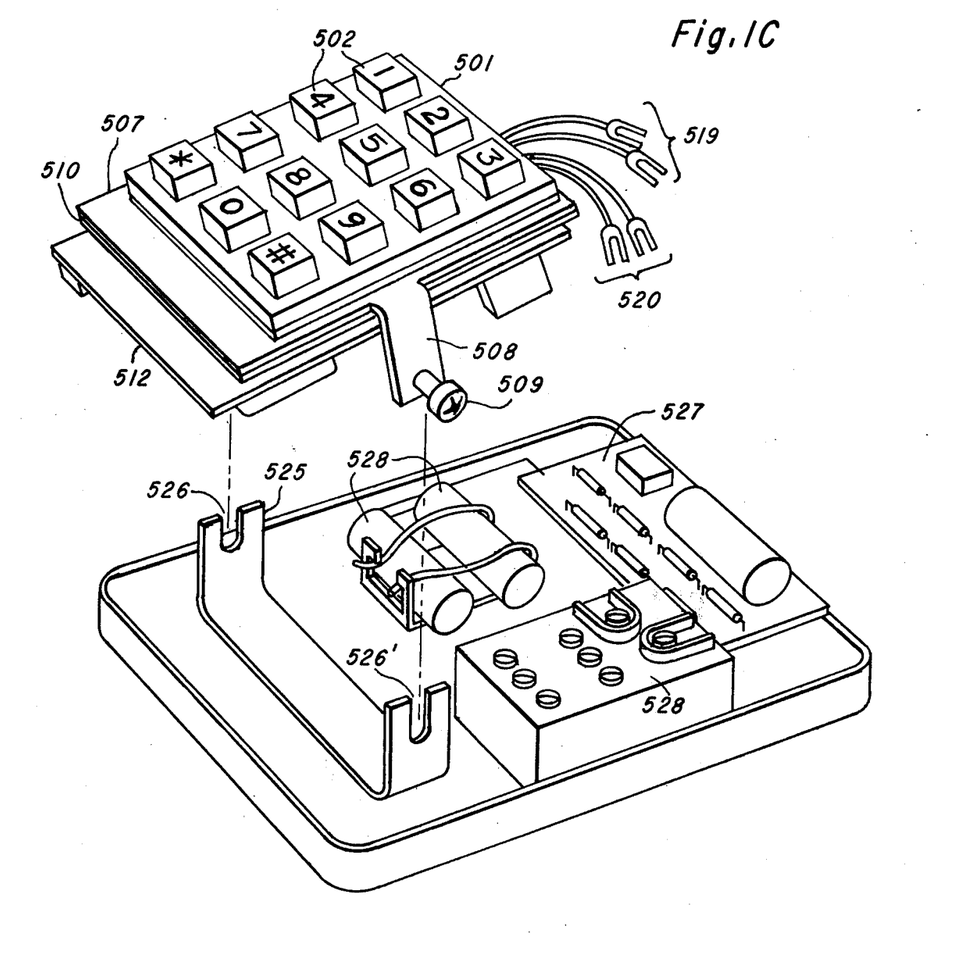
FIG. 1C is an isometric view showing the mounting of the automatic dial assembly of FIG. 1B in a standard subscriber telephone to provide such telephone with automatic dialing capability in accordance with the present invention.

The completed dial assembly is shown in FIG. 1C and is approximately in size and shape the same as a standard touch tone dial assembly. The dial is therefore conveniently mounted in any standard telephone having a standard telephone bracket 525 with openings 526 and 527' to accept tabs 508 and 508' with screw members 509 and 509' tightened to hold the assembly in place. The switch means 514 is mounted on the printed circuit board in such orientation that switch means 514 is in mechanical communication with switch hook mechanism 503 and controlled thereby.

Two pairs of wires are provided from the dial assembly; a first pair of wires 519 across which a short circuit is provided by the dial as the keys are being actuated to provide a muting effect in the receiver of the handset 504, and a second pair of wires 520 to provide a pulse or tone generated dial signal to the telephone network 528 which is transmitted on the telephone lines. In this particular embodiment, a DC power supply 527 is provided within the telephone housing to provide a DC voltage to the integrated circuits of the telephone dial. The illustrated power supply 527 includes an external transformer (not shown) which steps down house current connected to a diode bridge circuit and filter. Rechargeable batteries 528 are also provided to maintain the data stored in RAMs 517 and 518 in case of a power failure or the removal of the transformer from its outlet. In this manner, the telephone instrument may be removed from one location to another without the repertoire of telephone numbers stored in RAMs 517 and 518 being erased. The power supply 527 is coupled to the circuits on printed circuit board 512 by means of terminals 513 shown in FIG. 1B.

Two preferred embodiments of the circuit comprising an automatic dial in accordance with the present invention will now be described in detail. A dial pulse embodiment of the invention is shown and described with respect to FIG. 2A and a tone generator embodiment of the invention is shown and described with respect to FIG. 2B.

Figure 2A:
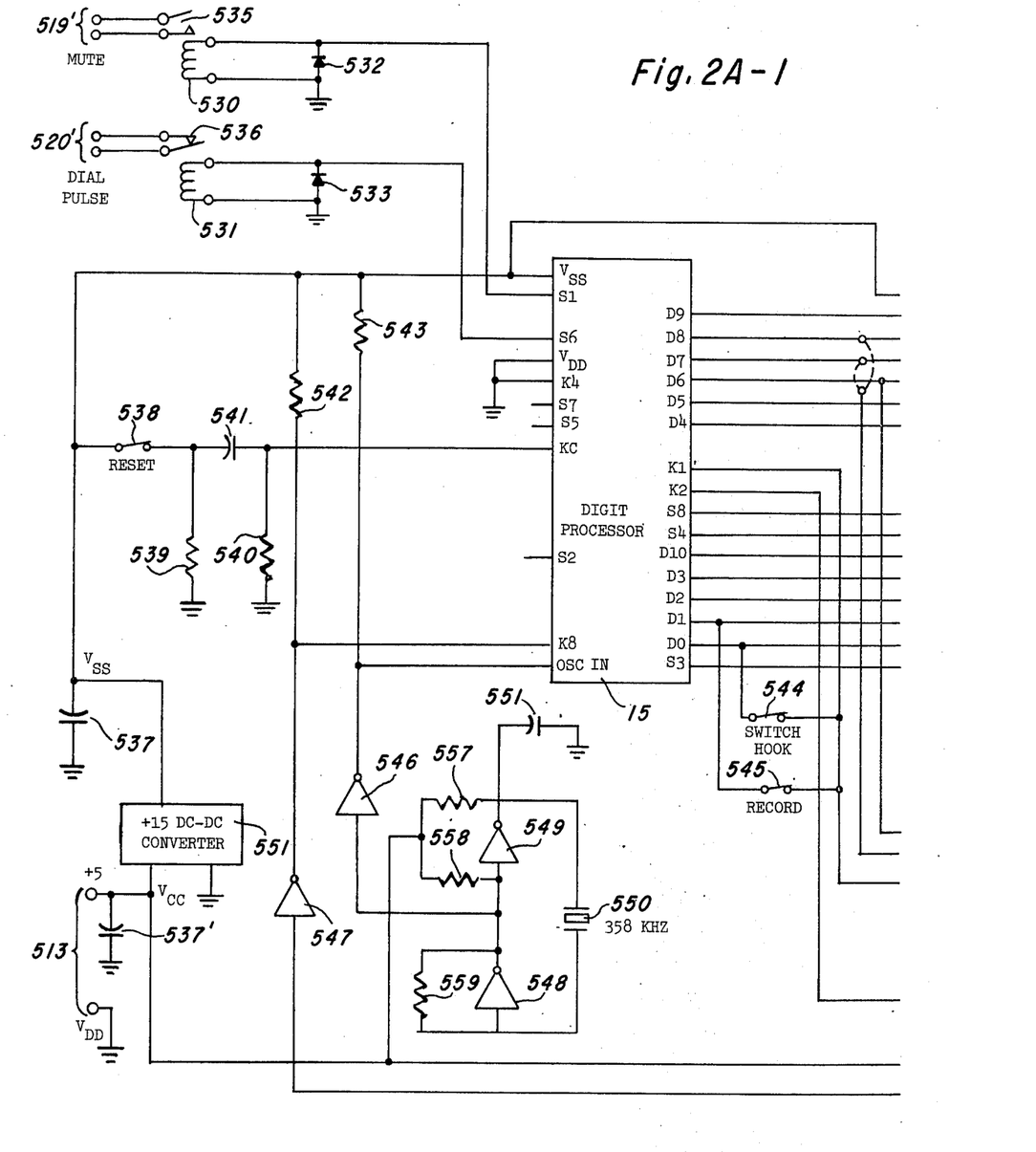
FIG. 2A, shown in two parts, is a circuit diagram of an automatic dial system embodied in the present invention which generates pulse output signals.
FIG. 2B, shown in two parts, is a circuit diagram of an automatic dial system embodied in the present invention which generates a tone output.
Figure 2A:
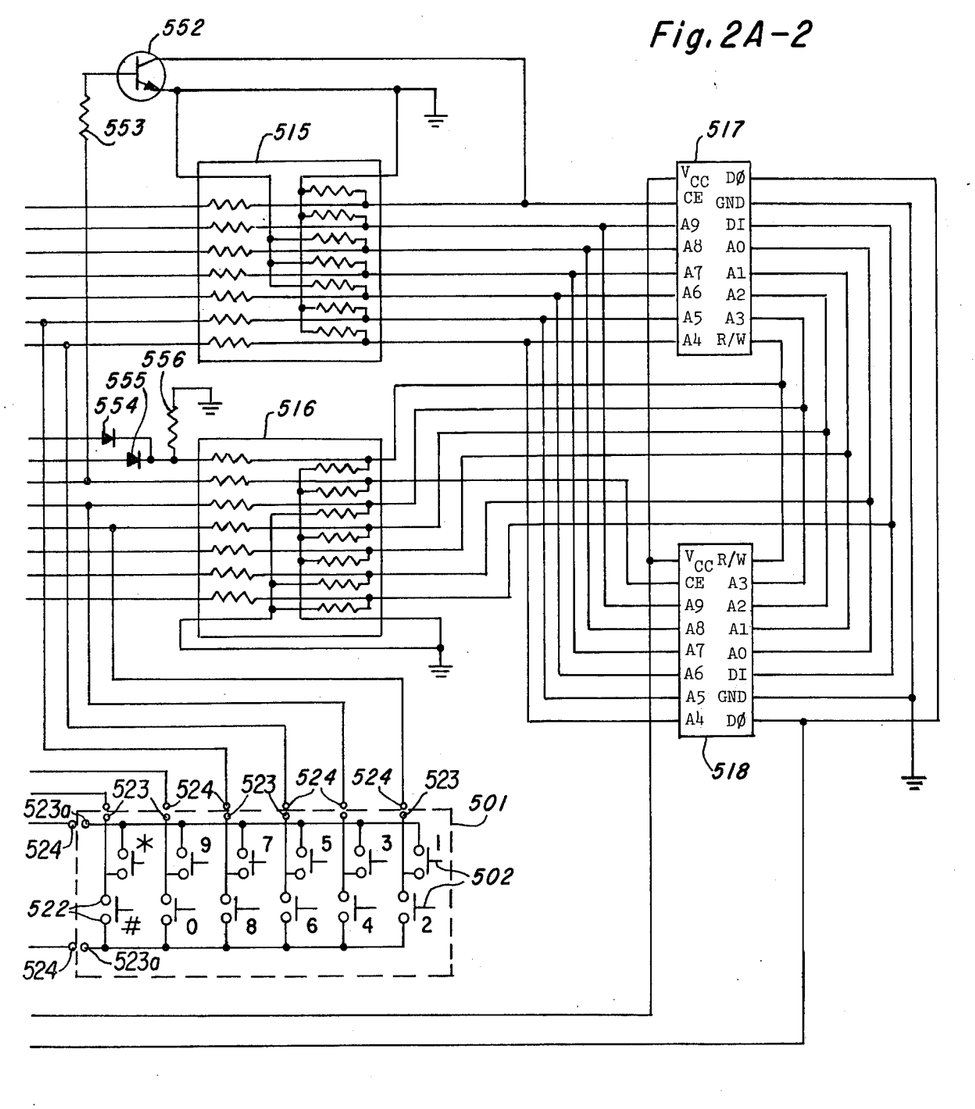
Figure 2B:
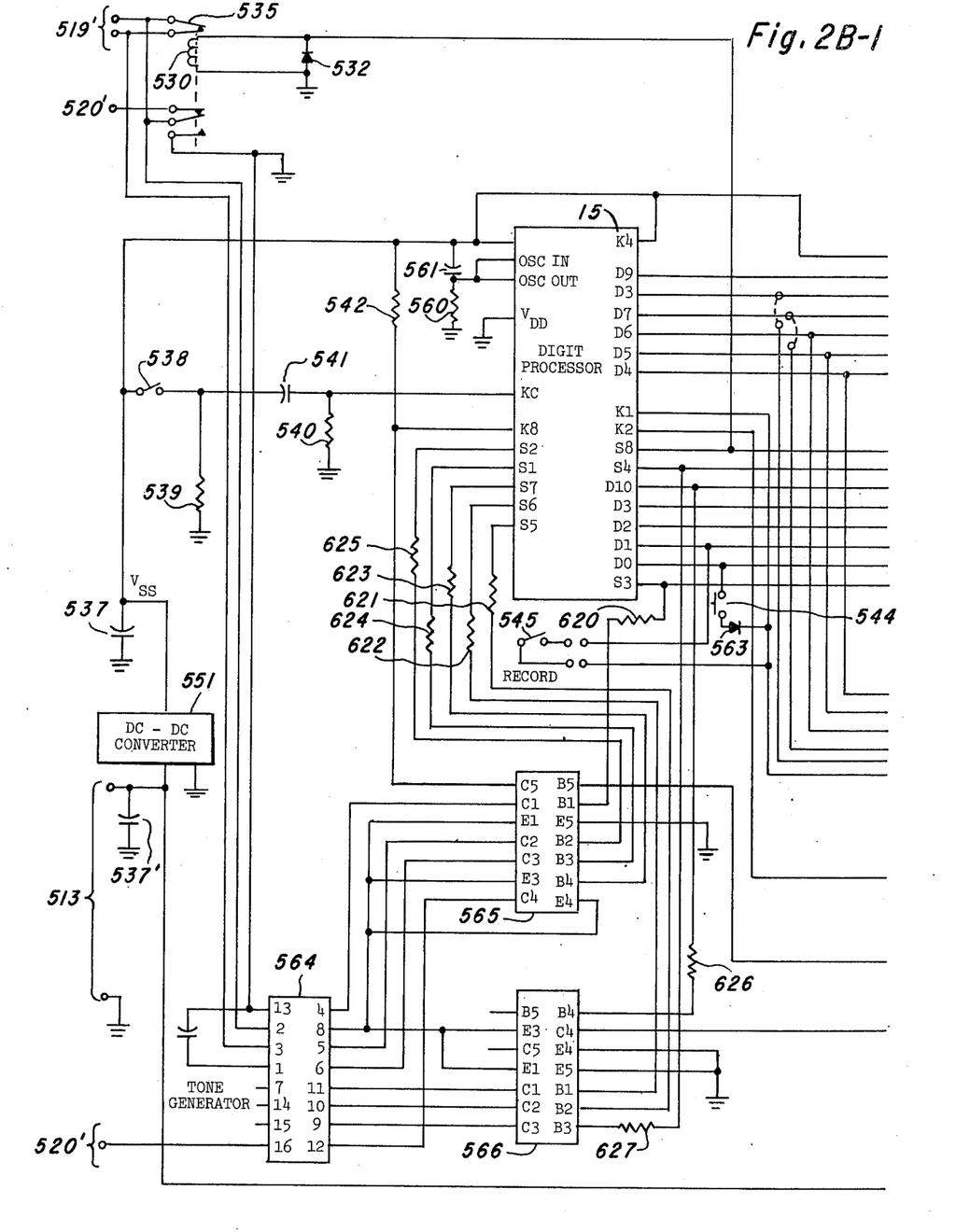
Figure 2B:
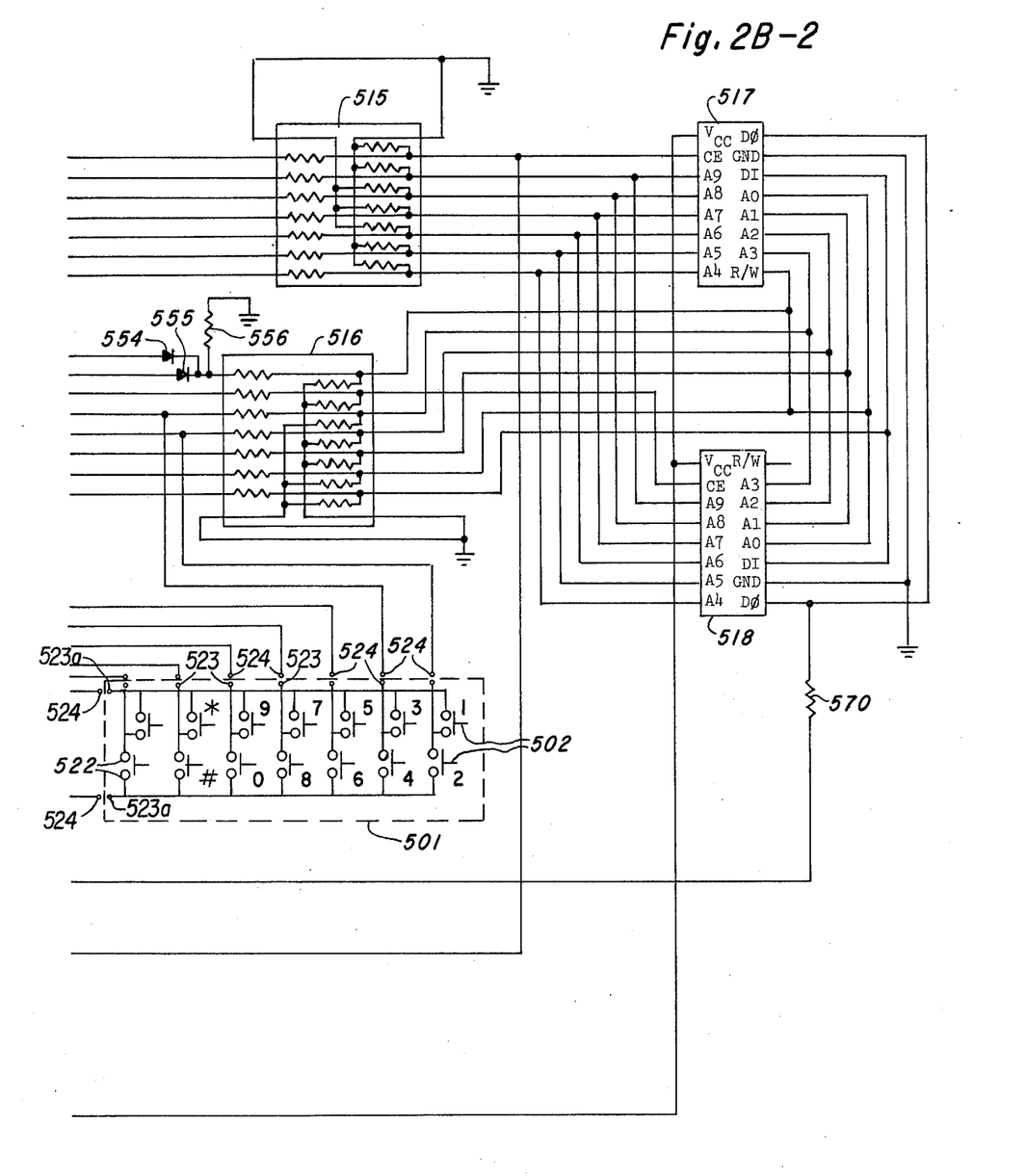

Referring then to FIG. 2A, the automatic dial utilizes the keyboard array 501 to enter coded information into the integrated circuit digit processor 15. Digit processor 15 which includes a programmed ROM for storing an instruction set to control the operation of the dial, an arithmetic/logic unit for performing arithmetic and logic operations on data according to said instruction set, and a first read/write RAM for storing the data being processed will be described in detail with respect to FIGS. 3–25. The single pole, single throw key switches 502 include contacts 522 selectively coupled by means of terminals 524 to the keyboard input terminals K1 and K2 and to digit output terminals D2–D5 and D7. (Terminal D8 may also be utilized for additional function keys such as a speakerphone "on" key, etc.).

Signals sequentially generated at these digit output terminals are selectively transmitted by means of the keyboard array to input terminals K1 and K2 so that the information input through the keyboard array is read into digit processor 15.

Contacts 544 of the switch hook responsive switch 514 and contacts 545 of a record-normal mode switch are coupled between input terminal K1 and digit output terminals D0 and D1, respectively, and their status is read along with the keyboard array.

A second integrated circuit RAM is provided, comprised in this embodiment of two 1K × 1 static random access memory chips such as the bipolar 2102 memory chips manufactured and sold as standard products by Texas Instruments Incorporated.

Other types and quantities of RAM chips may be utilized to provide the second RAM depending upon the quantity of telephone numbers desired to be stored in the repertoire by adjusting respective instructions (Table I) stored in the digit processor ROM, accordingly.

Digit processor 15 includes an internal oscillator to provide clock signals for operation of the circuit. However, in a preferred dial pulse embodiment as illustrated in FIG. 2A, an external oscillator is utilized to provide extremely accurate dial pulses on output terminals 520′. The external oscillator is comprised of a 358 KHz crystal 550 coupled in parallel with two series connected inverters 548 and 549 with the clock output taken from inverter 546 to the OSC IN terminal of digit processor 15, as shown. Resistors 557-559 and capacitor 551 are included in the oscillator circuit and resistor 543 couples the output of inverter 546 to $V_{SS}$. In this embodiment, power supply 527 provides +5 volts between the $V_{DD}$ ground terminal and $V_{CC}$ terminals 513. The +5 volts is utilized to directly power the bipolar RAM chips 517 and 518 while a DC-DC converter 551 is utilized to generate +15 volts to the $V_{SS}$ terminal of digit processor 15 to power the MOS circuitry thereof. Capacitors 537 and 537′ are utilized as filters. A reset switch 538 mechanically coupled to the switch hook 503 is electrically coupled between $V_{SS}$ and the KC input terminal of digit processor 15. When the switch 538 is open, the KC terminal is grounded through a resistor 540 while, when the switch 538 is closed, KC terminal is coupled to $V_{CC}$ by means of capacitor 541 and resistor 539. The digit output D0 terminal of RAM chips 517 and 518 are coupled to the K8 keyboard input terminal of digit processor 15 by means of inverter gate 547 and resistor 542 so that telephone numbers stored in the RAMs are transferred to the digit processor 15 for processing.

Digit processor 15 includes digit output terminals D0–D12 and S (segment) output terminals S1–S8. In this particular embodiment, the RAMs 517 and 518 are selectively coupled to the D and S outputs by means of resistive networks 515 and 516 which convert the MOS output voltage level to bipolar input voltage levels for bipolar RAM chips 517 and 518. The D0–D9 output terminals of digit processor 15 are respectively coupled to the address input terminals A0–A9 of RAM chips 517 and 518 for addressing of the RAM to store and retrieve telephone numbers therefrom. The read/write select input of RAM chips 517 and 518 receive a selection signal from the S4 or S8 output terminal of digit processor 15 which are coupled thereto by means of diodes 554 and 555 and to ground by means of resistor 556. Thus, the read/write input is maintained at a logic 0 level by resistor 556 to ground when the outputs S4 and S8 are turned off. RAM chip 517 is enabled at the CE input thereof when the digit output D10 is at a logic 0 by inverter means provided by transistor 552 in combination with resistor 553. When the output at D10 is a logic 1, a chip enable signal is provided to the CE terminal of chip 518. Telephone numbers are transmitted from output S3 of the digit processor 15 to the data input terminals DI of RAM chips 517 and 518 in order to be stored in the RAM.

As previously discussed, the embodiment of FIG. 2A is utilized to provide dial pulses at output terminal 520′. The dial pulses are transmitted directly from output terminal S6 of digit processor 15 to relay coil 531 to generate pulses at relay contacts 536. A mute output is provided at terminals 519′ by means of an output taken directly from output terminal S1 to relay coil 530 which closes contacts 535 to provide a short circuit across the handset speaker while the dial pulses are being transmitted over the lines. Protection diodes 532 and 533 are coupled across relay coils 530 and 531, respectively. It should be noted that a particular feature of this embodiment is that the dial in the normal mode acts as a conversion means to convert a rotary dial phone to a pushbutton phone without any special external or central office equipment required for this function.

Referring to FIG. 2B, another embodiment of the invention is shown in which tone signals are generated at output 520′ instead of dial pulses. All parts in FIG. 2B which are identical to parts in the embodiment of FIG. 2A are identically numbered and only that portion of the circuitry which is different will now be described in further detail. In particular, in this embodiment, the internal oscillator is utilized to provide the clock signals to the digit processor 15. The frequency of the oscillator is adjusted by means of external resistor 560 and external capacitor 561 coupled as shown to the OSC OUT terminal. The OSC OUT terminal is coupled to and provides the desired clock signals to the OSC IN terminal. Instead of dial pulses provided on terminal S6, digital tone signals are generated on terminals S1–S7 and D10 which are input to tone generator 564. Tone generator 564 generates particular tones, depending on the digital inputs thereto, as output signals on terminals 520′. Tone generator 564 is a standard part manufactured and sold, for example, by Microsystems International Ltd. of Canada under the manufacturer's part number MH8913J. The digit outputs from terminals S1–S7 and D10 are provided to tone generator 564 by means of resistors 620–627 and transistor arrays 565 and 566 which interface the MOS voltage level of digit processor 15 to the voltage levels required by tone generator 564. Transistor arrays 565 and 566 are also commercially available parts manufactured, for example, by Microsystems International Ltd. of Canada under the part number ML4036.

Figure 3:
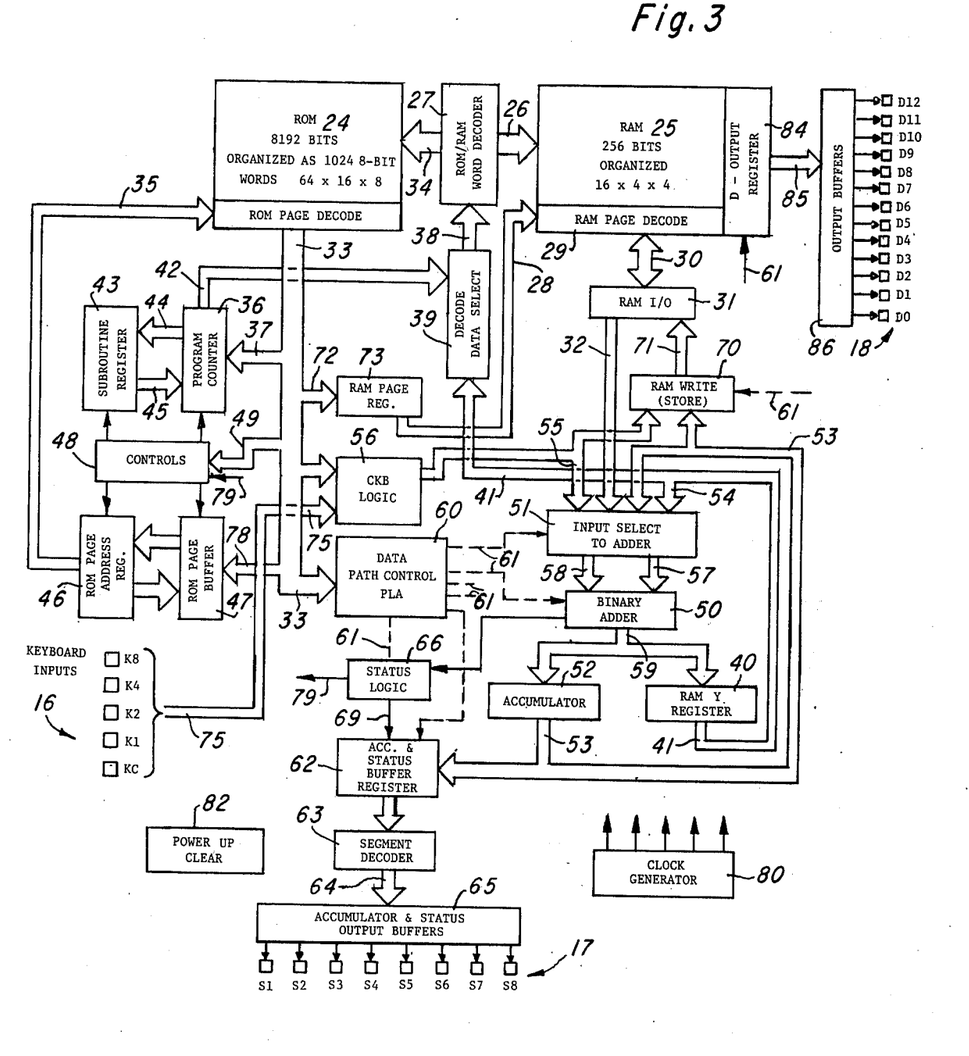
FIG. 3 is a detailed block diagram of a digit processor utilized in the preferred embodiment of the present invention.

A block diagram of the digital processor 15 which is particularly suitable for use in conjunction with the automatic dial system of the invention, implemented on a single semiconductor chip, is shown in FIG. 3. Digit processor 15 is centered around a ROM 24 and a RAM 25. The ROM 24 contains 1024 instruction words of eight bits per word, and is used to store the program which operates the automatic dial system. RAM 25 contains 256 memory cells software organized as four sixteen-digit groups with four bits per digit. Numerical data entered by the keyboard is stored in RAM 25, along with intermediate and final results of calculations, as well as status information or "flags," and other working data. RAM 25 functions as the working registers of digit processor 15, although it is not organized in a hardware sense as separate registers as would be true if shift registers or the like were used for this purpose. RAM 25 is addressed by a word address on lines 26, i.e., one out of sixteen word lines in RAM 25 is selected, by means of a combined ROM and RAM word address decode circuit 27. One of four "pages" of RAM 25 is selected by an address signal on two lines 28 applied to a RAM page address decoder 29 in RAM 25. For a given word address on lines 26 and page address on lines 28, four specific bits are accessed and read out on RAM I/O lines 30, via input/output circuit 31, to RAM read lines 32. Alternatively, data is written into RAM 25 via the input/output circuitry 31 and the lines 30. The same sixteen lines 26 used to address RAM 25 are also used to generate the output address and keyboard scan signals on the lines 18 (D0–D12); to this end the lines 26 pass through the RAM 25 and are connected to output registers and buffers as will be explained.

ROM 24 produces an eight-bit instruction word on ROM output lines 33 (the bits of the instruction word being labeled R0–R7) during each instruction cycle. The instruction is selected from 8192 bit locations in the ROM, organized into 1024 words containing eight bits each. The words are divided into sixteen groups or pages of sixty-four words each. To address an instruction in the ROM requires a one-of-sixty-four ROM word address on lines 34 and a one-of-sixteen ROM page address on lines 35. The ROM word address on lines 34 is generated in the same decoder 27 as used to generate the RAM word address on lines 26. The ROM word address is a six-bit address produced in a program counter 36 which is a six-stage shift register that may be updated after an instruction cycle or may have a six-bit address loaded into it via lines 37 from ROM output lines 33 for a call or branch operation. The RAM and ROM word address decoder 27 receives a six-bit encoded address on lines 38 from decode data select unit 39 which has two inputs. The unit 39 may receive a four-bit address from RAM Y register 40 via lines 41, or it may receive a six-bit address from the program counter 36 via lines 42. A six-bit subroutine register 43 is associated with the program counter 36 to serve as temporary storage for the return word address during subroutine operations. A six-bit address is stored in the register 43, via lines 44 when a call instruction is initiated so that this same address may be loaded back into the program counter 36 via lines 45 when execution of the subroutine which begins at the call location has been completed; this conserves instruction words and makes programming more flexible. The ROM page address on lines 35 is generated in a page address register 46 which also has a buffer register 47 associated with it for subroutine purposes. The register 46 will always contain the current page address for the ROM, and directly accesses the ROM page decoder. The buffer register 47 is a multi-function buffer and temporary storage register, the contents of which can be the present ROM page address, an alternate ROM page address, or the return page address during subroutine operations. The program counter, subroutine register and ROM page addressing are all controlled by control circuitry 48 which receives inputs from the ROM output lines 33 via lines 49. The control circuitry 48 determines whether branch and call on "status" or subroutine operations are performed, causes loading of an instruction word into the program counter and/or page address register, controls transfer of bits to the subroutine or buffer registers and back, controls updating of the program counter, etc.

Numerical data and other information is operated upon in the system by a binary adder 50 which is a bit-parallel adder having a precharged carry circuit, operating in binary with software BCD correction. The input to the adder 50 is determined by an input selector 51 which receives four-bit parallel inputs from several sources and selects from these what inputs are applied to the adder. First, the memory read or recall lines 32 from the RAM 25 provide one of the alternatives. Two registers receive the adder output, these being the "RAM Y" register 40 and an accumulator 52, and each of these has output lines separately connected as inputs 53 and 54 of the selector 51. A fourth input 55 receives an output from "CKB" logic as will be explained. Thus, the adder input is selected from the following sources: data memory or RAM 25 on lines 32; accumulator 52 via lines 53; RAM Y register 40 via lines 54; constant, keyboard or "bit" information from CKB logic 56 on lines 55. Positive and negative inputs to the adder 50 on lines 57 and 58 are produced from the selector circuitry 51.

The output from the adder 50 is applied to either or both the RAM Y register 40 and the accumulator 52 via lines 59. All of the operations of the adder 50 and its input selector 51, etc. are controlled by a data path control PLA 60 which is responsive to the instruction word on lines 33 from the ROM. Control outputs 61 from the control PLA 60 are indicated by dotted lines. The four-bit output from the accumulator can be applied via lines 53 to an accumulator output buffer 62 and thus to a segment decoder 63 for output from the system. The segment decoder 63 is a programmable logic array and produces up to eight segment outputs on lines 64 which are applied to a set of eight output buffers 65 for addressing of the RAM 401. The output arrangement contains memory in the buffer 62 so that an output can be held for more than one machine cycle. Output is under control of the data control logic PLA 60 which is responsive to the instruction word on lines 33 from the ROM.

A status logic circuit 66 provides the function examining for carry or compare from the adder 50, and determining whether to branch or call. To this end, inputs from the adder 50 via lines 67 and input from the control PLA 60 via lines 61 are provided. The status logic 66 includes a latch which produces an output 69 to the output buffer register 62.

A control circuit 70 determines what and when data is written into or stored in the RAM 25 via input/output control 31 and lines 30. This RAM write control 70 receives inputs from either the accumulator 52 via lines 53 or the CKB logic 56 via lines 55, and this circuit produces an output on lines 71 which go to the RAM I/O circuit 31. Selection of what is written into the RAM is made by the instruction word on lines 33, via the data path control PLA 60 and command lines 61. An important feature of the system is that constants or keyboard information, from CKB logic 56, as well as the adder output via the accumulator, may be written into RAM 25 via the write control 70, and further the CKB logic 56 can be used to control the setting and resetting of bits in RAM 25 via the write control 70.

The RAM page address into which data is written is determined by two bits of the instruction word on lines 33, as applied via lines 72 to a RAM page address register 73 and thus to lines 28 which select the RAM page. The RAM word or Y address is, of course, selected by the contents of RAM Y register 40, select circuit 39, and decoder 27.

The four keyboard inputs 16 appear on lines 75, from which an input to the CKB logic 56 is provided. In normal operation, a keyboard input goes via CKB logic 56 to the accumulator 52 or RAM Y register 40, from whence it is examined by software or ROM programming. In manufacture of the chips, a test mode is possible, where the keyboard input on lines 75 can be entered directly into the ROM page buffer address register 46, as will be explained. Also, during hardware clear using the KC input, the K lines can be entered into the page address register, or a K line can be used as an interrupt.

Also included within the chip 15 is a clock oscillator and generator 80 which generates internally a basic clock frequency of about 500 KHz or less, and from this produces five clocks $\theta_1$ to $\theta_5$ used throughout the system. A power-up-clear circuit 82 produces controls which clear the calculator when the power is turned on.

The outputs 18 (D0–D10) from the chip 15, used for keyboard scanning and generating output addresses to RAMs 517 and 518 as will henceforth be explained in detail, are generated from the RAM word address on lines 26 by an output register 84 which is loaded under control of lines 61 as addressed by ram word lines 26. The output from the register 84 is connected via lines 85 to a set of output buffers 86. Sixteen outputs are possible, but only the eleven (D0–D10) are provided as outputs to address the RAMs 517 and 518.

The register 84 is a random access register, where all bits are separately, independently, and mutually exclusively addressed. In this embodiment, only thirteen stages are provided in the register 84, so only the first thirteen of the sixteen address lines 26 are used. When one of the twelve bits in the register 84 is addressed from decoder 27, this bit may be either set or reset as determined by controls 61 from the control PLA, i.e., from the current instruction word. The bit will remain set or reset until again specifically addressed and changed; meanwhile any or all of the other bits may be addressed and set or reset in any order. Thus, it is possible to have any combination of D register bits either set or reset, providing in this embodiment $2^{13}$ or 8192 code combinations on the output lines 18 for the addressing of RAMs 517 and 518. During power up or hardware clear, all the bits of the register 84 are unconditionally reset.

Similar to the register 84, the other output register 62 is static in that the contents once entered will remain until intentionally altered. The output register 62 functions as an output data buffer while the accumulator 52 and status latch 66 are being manipulated to form the next output. The output register 84 is a similar buffer for outputting the contents of the Y register 40, but has the additional feature of being fully random access. The data sources for the Y register 40 are the following: a four-bit constant stored in the ROM 24 as part of an instruction word; the accumulator 52 transferred to the Y register 40 via the selector 51 and adder 50; and data directly from the RAM 25. Once data is in the Y register 40 it can be manipulated by additional instructions such as increment or decrement.

The circuits and operation of digit processor 15 and the controlling programs stored in ROM 24 thereof are described in further detail in the referenced patent application Serial No. (TI-5252).

The automatic dial as described herein provides any standard telephone with automatic dialing capability to dial a stored repertoire of telephone numbers and/or convert a rotary dial telephone to a pushbutton dialing telephone. The operation of the automatic dial is controlled by digit processor 15 and ultimately by the program stored in ROM 24 which controls digit processor 15 as described above. An example of the operations of one such automatic dial will next be described in detail.

The automatic dialer telephone including the automatic dial of FIG. 2A may provide, for example, storage of 31 number sequences of up to 15 digits, automatic or manual dialing, a programmable pause, and last number dialed repeat. Change of mode can be controlled by keying in a selected code sequence through keyboard array 501' or a separate programming record-normal mode function switch 545 may be provided and connected to terminals provided therefor on circuit board. The programming switch 545 may be located, for example, under the handset cradle of a standard telephone or as a special key on the keyboard of the telephone illustrated in FIG. 1A. The programming switch 545 is maintained in the normal position during the normal dial mode and is in the record position when numbers are to be stored in the repertoire of frequently called numbers.

In this example, virtual address locations 01 through 31 are used to store frequently dialed numbers. Each virtual address is set up to store up to 15 digits including pauses. A pause is used when automatic dialing of outside lines through a PBX or Centrex system is desired. Brief delays are required until progressive dial tones occur and it is desirable to store a pause in selected digit positions to provide such delays where required. The pause is stored instead of a numerical digit by keying in the number symbol ( # ) key. When the automatic dial is operating in the normal dial mode, dialing signals are transmitted over the lines and the dial will stop at the pause time. The user must then release the pause function by depressing the number symbol key when he hears the next level dial tone which causes the dial to continue the dialing procedure.

Digital processor 15 may be programmed to either be normally in the direct dial mode requiring entry of some coded signal from the keyboard array to cause the dial to go into the auto-dial mode or the digit processor may be programmed to normally be in the auto-dial mode requiring entry of a coded signal from the keyboard array to cause the dial to go into the direct dial mode. Considering an example in which the automatic dial is programmed to normally be in the autodial mode, a telephone number stored in the repertoire of telephone numbers is dialed by sequentially depressing two number keys corresponding to the two number virtual address (01–31). Manual direct dialing in this example is accomplished by simply preceding the desired number with depression of the asterisk (*) key. All other operations are the same as that of any standard pushbutton (touch tone) dial telephone. Dial signals begin to be transmitted immediately, even as the remaining digits of a telephone number are being keyed in. Thus, except for the restriction that the user must wait for progressive dial tones before dialing successive numbers when used with PBX or Centrex systems, numbers may be manually keyed in as rapidly as desired; the automatic dial will transmit the corresponding pulse or tone dialing signals at a proper rate.

A last number repeat feature may be provided by the depression of a specified code such as, in this example, the virtual address 00. This causes the dial to automatically redial the last number sequence previously dialed.

The selected frequently called telephone numbers are stored in the repertoire of telephone numbers as follows. The user assigns a virtual address location to each of the number sequences desired to be stored in the repertoire. The numbers are stored with the receiver on-hook; that is, with switch 544 in the closed position. The programming record-normal mode switch 545 is set to record. The two-digit virtual address is first keyed in followed by all successive numbers necessary to complete the call, including pauses as required, and returning the programming switch 545 to the normal position. This procedure is repeated for all telephone number sequences as they are desired to be included in the stored repertoire.

If an error occurs at any point during the programming, programming switch 545 is returned to the normal mode and the procedure is repeated by again switching programming switch 545 to the record mode and rekeying the number sequence. Number sequences are changed by following the programming procedure, as the digit processor automatically causes the erasure of the old telephone number as it stores the new one.

To automatically dial a number, handset 504 is lifted, the dial tone heard, and the address location of the desired number keyed in with the programming switch in the normal mode.

Various embodiments of the invention have now been described in detail. Since it is obvious that many changes and modifications can be made in the above-described details without departing from the nature and spirit of the invention, it is understood that the invention is not to be limited to said details except as set forth in the appended claims.

What is claimed is:

1. An automatic dial assembly for a telephone set comprising:
   a. a bracket member having upper and lower major surfaces for mounting said automatic dial system in the telephone set;
   b. a keyboard array having a plurality of keys, said array being mounted on the upper major surface of said bracket member and including a first set of terminal members selectively coupled to said array;
   c. a circuit board mounted on the lower major surface of said bracket member, said circuit board including an integrated circuit digit processor having at least one set of input terminals and at least one set of output terminals, and signal generator means for generating dial signals mounted thereon, said circuit board including a second set of terminal members and a plurality of conductor members selectively coupling said second set of terminal members to the input terminals of said digit processor and selectively coupling at least one output terminal of said digit processor to said signal generator means; and
   d. means selectively electrically coupling the first set of terminals on said keyboard array to the second set of terminals on said circuit board.

2. The automatic dial assembly according to claim 1 including an electrically insulating member located between the lower major surface of said bracket member and said circuit board.

3. The automatic dial assembly according to claim 1 wherein said signal generator means is a pulse responsive relay means for generating dial pulse signals.

4. The automatic dial assembly according to claim 1 wherein said signal generator means is a tone generator for generating a plurality of different tones corresponding to digital signals provided by said digit processor.

5. The automatic dial assembly according to claim 1 including a switch mounted on said printed circuit board for providing reset data to said digit processor, said switch being positioned on said circuit board to be in mechanical communication with a switch hook of the telephone set.

6. The automatic dial assembly according to claim 1 wherein said mounting bracket includes two bent over members for mounting said automatic dial in a corresponding bracket of the telephone set.

7. An automatic dial assembly for a telephone set comprising:
   a. a bracket member having upper and lower major surfaces for mounting said automatic dial system in the telephone set;
   b. a keyboard array having a plurality of keys, said array being mounted on the upper major surface of said bracket member and including a first set of terminal members selectively coupled to said array;
   c. a circuit board mounted on the lower major surface of said bracket member, said circuit board including:
      i. an integrated circuit digit processor having at least one set of input terminals and at least one set of output terminals,
      ii. random access memory means having data input terminal means, data output terminal means, and address means,
      iii. signal generator means for generating dial signals mounted thereon,
      iv. a second set of terminal members, and
      v. a plurality of conductor members selectively coupling said second set of terminal members to the input terminals of said digit processor and selectively coupling the output terminals of said digit processor to said random access memory means and to said signal generator means; and
   d. means selectively electrically coupling the first set of terminals on said keyboard array to the second set of terminals on said circuit board.

* * * * *